United States Patent [19]

Aydin et al.

[11] Patent Number: 5,100,948
[45] Date of Patent: Mar. 31, 1992

[54] AQUEOUS FORMULATIONS SUITABLE AS SEALING COMPOUNDS OF ADHESIVES FOR CERAMIC TILES

[75] Inventors: Oral Aydin, Mannheim; Rainer Hummerich, Worms; Joachim Krobb, Landau; Michael Portugall, Wachenheim; Falko Ramsteiner, Ludwigshafen; Albrecht Zosel, Weinheim, all of Fed. Rep. of Germany

[73] Assignee: BASF Aktiengesellschaft, Ludwigshafen, Fed. Rep. of Germany

[21] Appl. No.: 545,118

[22] Filed: Jun. 27, 1990

Related U.S. Application Data

[63] Continuation of Ser. No. 413,588, Sep. 28, 1989, abandoned.

[30] Foreign Application Priority Data

Oct. 14, 1988 [DE] Fed. Rep. of Germany ....... 3835041

[51] Int. Cl.$^5$ .............................................. C08K 3/26
[52] U.S. Cl. ................................... 524/425; 524/262; 524/588
[58] Field of Search ............... 524/262, 425, 837, 547, 524/588

[56] References Cited

U.S. PATENT DOCUMENTS

| | | | |
|---|---|---|---|
| 4,353,997 | 10/1982 | Keough | 524/425 |
| 4,716,194 | 12/1987 | Walker et al. | 524/837 |
| 4,837,217 | 5/1989 | Jorgensen et al. | 525/100 |

FOREIGN PATENT DOCUMENTS 0212771 4/1987 European Pat. Off. .
022479 6/1987 European Pat. Off. .

Primary Examiner—Joseph L. Schoffer
Assistant Examiner—R. H. Delmendo
Attorney, Agent, or Firm—Oblon, Spivak, McClelland, Maier & Neustadt

[57] ABSTRACT

Aqueous formulations suitable as sealing compounds or adhesives for ceramic tiles essentially contain A) from 3 to 30% by weight of plastics particles which consist of
  a) from 0.1 to 4% by weight of one or more mercaptosilanes of the general formula I

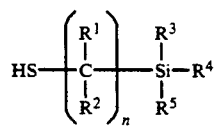

where n is from 1 to 8, $R^1$ and $R^2$ are hydrogen and/or $C_1$–$C_4$-alkyl, $R^3$, $R^4$ and $R^5$ are $C_1$–$C_6$-alkyl and/or $C_1$–$C_6$-alkoxy, with the proviso that one or more of the radicals $R^3$ to $R^5$ is alkoxy, and
  b) ethylenically unsaturated monomers capable of undergoing free radical polymerization, as the residual amount,
  the polymer having a glass transition temperature of from −60 to +40° C.,
B) from 40 to 90% by weight of an inorganic filler,
C) an effective amount of an emulsifier,
D) from 0 to 15% by weight external plasticizer and
E) from 5 to 40% by weight of water.

8 Claims, No Drawings

AQUEOUS FORMULATIONS SUITABLE AS SEALING COMPOUNDS OF ADHESIVES FOR CERAMIC TILES

This application is a continuation of application Ser. No. 07/413,588, filed on Sept. 28, 1989, now abandoned.

The present invention relates to aqueous formulations suitable as sealing compounds or adhesives for ceramic tiles and essentially containing A) from 3 to 30% by weight of plastics particles which consist of
  a) from 0.1 to 4% by weight of one or more mercaptosilanes of the general formula I

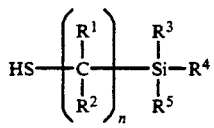

where n is from 1 to 8, $R^1$ and $R^2$ are hydrogen and/or $C_1$–$C_4$-alkyl, $R^3$, $R^4$ and $R^5$ are $C_1$–$C_6$-alkyl and/or $C_1$–$C_6$-alkoxy, with the proviso that one or more of the radicals $R^3$ to $R^5$ is alkoxy, and
  b) ethylenically unsaturated monomers capable of undergoing free radical polymerization, as the residual amount,
  the polymer having a glass transition temperature of from $-60°$ to $+40°$ C.,
B) from 40 to 90% by weight of an inorganic filler,
C) an effective amount of an emulsifier,
D) from 0 to 15% by weight of an external plasticizer and
E) from 5 to 40% by weight of water.

Aqueous formulations containing plastic particles, inorganic fillers and effective amounts of an emulsifier are well known and are used, inter alia, as sealing compounds and adhesives for ceramic tiles. However, the fact that their adhesive bond in the solidified state has poor water-resistance is unsatisfactory.

DE-A 21 48 456 relates to building adhesives for adhesive bonds having improved wet adhesion, based on aqueous dispersions containing plastics particles and inorganic fillers, the plastics particles containing from 0.3 to 5% by weight of unsaturated alkoxysilanes as copolymerized units. However, the water resistance of the adhesive bonds of these building adhesives too is not completely satisfactory.

EP-A2-224795 discloses, as building adhesives having improved contact adhesion, aqueous plastics dispersions whose polymers contain from 0.01 to 0.5% by weight of mercapto-substituted saturated alkoxysilanes as copolymerized units.

It is an object of the present invention to provide aqueous formulations which are suitable as sealing compounds or adhesives for ceramic tiles and whose adhesion in the solidified state has even better water resistance than the aqueous formulations based on inorganic fillers and plastics particles containing from 0.3 to 5% by weight of unsaturated alkoxysilanes as copolymerized units.

We have found that this object is achieved by the formulations defined at the outset.

We have furthermore found that aqueous formulations which are particularly suitable as adhesives having improved wet adhesion for ceramic tiles are those which contain
from 3 to 25% by weight of component A,
from 50 to 85% by weight of component B,
from 0 to 15% by weight of component D,
from 10 to 30% by weight of component E and
an effective amount of an emulsifier C,
while the aqueous formulations which are preferably used as sealing compounds having improved wet adhesion are those which contain
from 15 to 30% by weight of component A,
from 40 to 60% by weight of component B,
from 0 to 15% by weight of component D,
from 15 to 25% by weight of component E and
an effective amount of an emulsifier C.

Component A advantageously contains mercaptosilanes I where n is from 2 to 4, as copolymerized units. Preferred radicals $R^1$ and $R^2$ are hydrogen and methyl, while advantageous radicals $R^3$ to $R^5$ are methyl, ethyl, methoxy and ethoxy, and one or more of the radicals $R^3$ to $R^5$ must be methoxy or ethoxy. Particularly preferred copolymerized mercaptosilanes I are 3-mercaptopropyltrimethoxysilane, 3-mercaptopropyltriethoxysilane and 3-mercaptopropylmethyldimethoxysilane. The mercaptosilanes I are known and are commercially available.

Examples of ethylenically unsaturated monomers which are capable of undergoing free radical polymerization and are suitable for synthesizing component A are acrylates and methacrylates of a $C_1$–$C_8$-alkanol, of a $C_9$–$C_{18}$-n-alkanol and of a diprimary $C_2$–$C_8$-n-alkanediol, $\alpha,\beta$-ethylenically unsaturated mono- or dicarboxylic acids of 3 to 5 carbon atoms and their mono- or diamides, which may be substituted at the N atoms by alkyl or alkylol groups of 1 to 3 carbon atoms, and acrylonitrile, methacrylonitrile, vinyl esters of $C_2$–$C_{12}$-n-alkanoic acids and, as vinylaromatic monomers, styrene, vinyltoluene, chlorostyrene or tert-butylstyrene.

Examples of acrylates are methyl, ethyl, isopropyl, n-butyl, isobutyl, n-hexyl, 2-ethylhexyl, decyl and dodecyl acrylate, n-butyl, isobutyl, n-hexyl and 2-ethylhexyl acrylate being of particular interest. Particular examples of methacrylates are methyl, isobutyl, n-butyl, tert-butyl, 2-ethylhexyl, dodecyl and octadecyl methacrylate.

Preferred hydroxyalkyl acrylates and methacrylates are 2-hydroxyethyl acrylate and methacrylate, 3-hydroxypropyl acrylate and methacrylate, 4-hydroxybutyl acrylate and methacrylate, 6-hydroxyhexyl acrylate and methacrylate and 8-hydroxyoctyl acrylate and methacrylate.

Particularly suitable $\alpha,\beta$-ethylenically unsaturated carboxylic acids are acrylic acid and methacrylic acid, and also crotonic acid, maleic acid, fumaric acid and itaconic acid The preferably used unsaturated acid amides and their derivatives are also derived from these acids, i.e. acrylamide, methacrylamide, N-methylolacrylamide, N-methylolmethacrylamide, N-methyl-, N-ethyl-, N-n-butylacrylamide and -methacrylamide, and also crotonamide, N-methylolcrotonamide, maleic acid monoamide and diamide, fumaric acid diamide and itaconic acid diamide.

Particularly suitable vinyl esters are vinyl acetate, vinyl propionate, vinyl butyrate, vinyl decanoate and vinyl dodecanoate.

The ethylenically unsaturated monomers may be present as homopolymerized or copolymerized units in component A, the number average molecular weight of A generally being from $5 \cdot 10^3$ to $5 \cdot 10^6$, preferably from $10^5$ to $2 \cdot 10^6$.

With the aid of the Fox relationship, the weights of the ethylenically unsaturated monomers in A are advantageously chosen so that A has a glass transition temperature $T_g$ of from $-60°$ to $+40°$ C.

Polymers A having a $T_g$ of from $-60°$ to $+10°$ C., in particular from $-55°$ to $-5°$ C., are preferably employed when the novel aqueous formulations are used as sealing compounds, and polymers A having a $T_g$ of from $-10°$ to $+40°$ C., in particular from $0°$ to $+30°$ C., are preferably employed when the said formulations are used as adhesives for ceramic tiles.

According to Fox (T. G.. Fox, Bull. Am. Phys. Soc. (Ser. II) 1 (1956), 123), the following is a good approximation for the glass transition temperature of copolymers:

$$\frac{1}{T_g} = \frac{X^1}{T_g^1} + \frac{X^2}{T_g^2} + \ldots \frac{X^n}{T_g^n}$$

where $X^1, X^2, \ldots, X^n$ are the mass fractions of the monomers $1, 2, \ldots, n$ and $T_g^1, T_g^2, \ldots, T_g^n$ are the glass transition temperatures of the corresponding homopolymers in degrees Kelvin. The glass transition temperatures of the homopolymers of the abovementioned monomers are known and are listed in, for example, J. Brandrup and E. H. Immergut, Polymer Handbook 1st Ed. J. Wiley, New York 1966 and 2nd Ed. J. Wiley, New York 1975.

The effect of the mercaptosilanes I on the glass transition temperature of A is generally negligible because of their small amount by weight.

The polymers A are advantageously prepared as plastics dispersions by the conventional method of emulsion polymerization.

Emulsifiers C which have proven particularly useful for this purpose are ethoxylated alkylphenols (degree of ethoxylation: 3 to 30, $C_8$–$C_{10}$-alkyl radical) and/or ethoxylated fatty alcohols (degree of ethoxylation: 5 to 50, $C_8$–$C_{25}$-alkyl radical), the sodium salts of alkylsulfonic acids, such as sodium n-dodecylsulfonate or sodium n-dodecylbenzenesulfonate, and ethoxylated alkylphenols which are additionally sulfated (degree of ethoxylation: 5 to 50, $C_8$–$C_{10}$-alkyl radical). Particularly suitable water-soluble polymerization initiators are peroxydisulfates, such as potassium peroxydisulfate, or combined systems which contain an organic reducing agent and a peroxide, e.g. formaldehyde sodium sulfoxylate/hydrogen peroxide. The emulsion polymerization temperature is in general from $30°$ to $150°$ C., preferably from $50°$ to $90°$ C. After the end of the polymerization, the ready-prepared dispersion is advantageously brought to a pH of from 3 to 9 with ammonia.

Aluminum silicates, quartz, precipitated or pyrogenic silica, gypsum and barite, talc, dolomite and, particularly preferably, calcium carbonate are advantageously added as component B. Other suitable components B, particularly for aqueous formulations to be used as sealing compounds, are color-imparting pigments. Preferably used white pigments are titanium white, lead white, zinc white, lithopone and antimony white, and preferably used black pigments are iron oxide black, manganese black, cobalt black, antimony black and carbon black, and preferably used colored pigments are, for example, chrome yellow, red lead, zinc yellow, zinc green, pink red, cadmium red, cobalt blue, Berlin blue, ultramarine, manganese violet, cadmium yellow, molybdate orange and strontium yellow. The fillers are generally added in finely divided form. The mean particle size is preferably from 0.5 to 200 μm, expressed as the arithmetic mean of the greatest diameters in each case.

In addition, the novel formulations may contain up to 15% by weight of low molecular weight organic substances suitable as external plasticizers D. Adipates, such as di-2-ethylhexyl adipate, diisooctyl adipate or diisodecyl adipate, phthalates, such as di-n-butyl phthalate, diisoheptyl phthalate, diisooctyl phthalate or dimethylglycol phthalate, acetates of a diethylene glycol monoalkyl ether whose alkyl group is of 2 to 5 carbon atoms, polyisobutenes having a number average molecular weight of 700 to 1,500 and oxyalkylated $C_8$–$C_{14}$-alkylphenols which are obtained by an addition reaction of from 5 to 10 moles of ethylene oxide and/or propylene oxide with 1 mole of alkylphenol are preferably used.

The novel formulations furthermore contain, as component E, from 5 to 40, preferably from 10 to 30, % by weight of water, a water content of from 15 to 25% by weight being particularly preferred for formulations to be used as sealing compounds.

Advantageously, this amount of water forms the dispersion medium for the plastics dispersions containing the polymers A. However, water may also be added in pure form to the novel formulations.

The novel formulations may contain, as additional assistants, minor amounts of agents for improving their adhesion, such as dihydrazine compounds and zinctetramine complexes, e.g. zinctetramine carbonate or zinctetramine acetate, thickeners, such as methylhydroxypropylcellulose, antifoams and preservatives, such as fungicides. Particularly in the case of formulations to be used as sealing compounds, it is advisable to add from 0.1 to 1% by weight of a thickener to the novel formulations.

The novel formulations are advantageously prepared by stirring the filler and the substances which may be used as plasticizers or further assistants into a 40-70% strength by weight aqueous plastics dispersion which contains component A as the disperse phase. To ensure homogeneous distribution of the fillers, from 0.2 to 0.6% by weight, based on the fillers, of wetting agents and dispersants may be added. Advantageously used wetting agents and dispersants are ammonium or alkali metal salts of low molecular weight polyacrylic acids, and polyphosphates such as sodium hexametaphosphate.

In addition to increased water resistance, the novel formulations in the solidified state possess, as a further noteworthy property, greater elasticity. This applies in particular to formulations which contain a polymer having a glass transition temperature of from $-60°$ to $+10°$ C. as component A, and is particularly advantageous when the said formulations are used as sealing compounds. A measure of the elasticity of solid materials is their elastic recovery. It expresses the extent to which the solid is returned to the original position when a deforming force is removed, and, for sealing compounds, is defined as follows according to DIN 52,458:

Elastic recovery =

$$\frac{\text{extended length} - \text{length after recovery}}{\text{extended length} - \text{original length}} \cdot 100$$

EXAMPLES

EXAMPLES D 1 TO D 5 AND COMPARATIVE EXAMPLE DV 1

Preparation of Various Dispersion Polymers

EXAMPLE D 1 (general method)

A mixture of
180 g of water,
0.06 g of the Na salt of ethoxylated (degree of ethoxylation 25) and sulfated p-isooctylphenol (emulsifier I),
0.06 g of ethoxylated (degree of ethoxylation 25) p-isooctylphenol (emulsifier II),
0.8 g of potassium peroxydisulfate and
6.5 g of monomer mixture D1
was heated to 85° C. and, after 15 minutes, an emulsion of
100 g of water
6 g of emulsifier I,
6 g of emulsifier II and
650 g of monomer mixture D 1
was added in the course of 2 hours at this temperature, with stirring, and a solution of
2.5 g of potassium peroxydisulfate in
80 g of water
was added simultaneously in a separate feed. Polymerization was then continued for a further hour. The ready-prepared dispersion was brought to pH 5 with 25% strength by weight aqueous ammonia solution.

The composition of the polymers, their glass transition temperature (calculated according to Fox) and the solids content of the particular dispersions D 1 to D 5 and DV 1 are shown in Table 1.

TABLE 1

| % of monomers | D 1 | DV 1 | D 2 | D 3 | D 4 | D 5 |
|---|---|---|---|---|---|---|
| n-Butyl acrylate | 48.8 | 48.7 | — | 86 | 86 | 86 |
| Ethylhexyl acrylate | — | — | 88 | — | — | — |
| Hydroxyethyl acrylate | — | — | — | 2 | 2 | 2 |
| Acrylic acid | 3 | 3 | 3 | 1.5 | 1.7 | 2 |
| Acrylonitrile | — | — | 8.9 | 5 | 5 | 4 |
| Styrene | 47.8 | 47.8 | — | — | — | — |
| Vinyl acetate | — | — | — | 5 | 5 | 5 |
| Methacryloxypropyl-trimethoxysilane | — | 0.5 | — | — | — | — |
| Mercaptopropyl-trimethoxysilane | 0.4 | — | 0.1 | 0.5 | 0.3 | 1.0 |
| Glass transition temperature (°C.) | +20 | +20 | −55 | −40 | −40 | −40 |
| Solids content (% by weight) | 60.1 | 60.1 | 60.1 | 65.1 | 65.0 | 64.8 |

EXAMPLES F 1 AND FV 1

Aqueous Formulations as Adhesives for Ceramic Tiles and the Water Resistance of Their Adhesive Bonds in the Solid State For the preparation of tile adhesives F 1 and FV 1,
5 g of the ester of acetic acid and diethylene glycol monobutyl ether,
45 g of a 5% strength by weight aqueous solution of methylhydroxypropylcellulose,
172.5 g of milled quartz having a mean particle size of 164 μm and
172.5 g of milled quartz having a mean particle size of 32 μm
were stirred into 100 g of dispersions D 1 and DV 1, each of which was diluted to 50% by weight.

To determine the water resistance of the adhesive bonds, an asbestos cement test plate (60×50 mm) was placed in a wet adhesive bed on an asbestos cement test element with the aid of polyvinylchloride spacers (1.5 mm), in such a way that a homogeneous bonded area (50×50 mm) was formed.

After drying for 14 days at 23° C. and 50% relative humidity, the adhesive bond was stored under water in separate experiments for 7 and 14 days at 23° C.

The maximum applied force (maximum force in N/bonded test area in mm²) was then determined in the wet state on a tensile testing machine at a take-off speed of 5 mm/min.

The results are shown in Table 2.

TABLE 2

| | Maximum applied force N/mm² | |
|---|---|---|
| | 7d | 14d |
| Tile adhesive F 1 | 0.16 | 0.28 |
| Tile adhesive FV 1 | 0.08 | 0.09 |

EXAMPLES M 2 TO M 5

Aqueous Formulations as Sealing Compounds and Their Elastic Recovery 43 g of the dispersions D 2 to D 5, each of which had been diluted to 60% by weight, were brought to pH 8 with a 25% strength by weight aqueous ammonia solution. 8 g of dimethylglycol phthalate and 1 g of iron oxide black (mean particle size 1 μm) and 70 g of finely divided $CaCO_3$ (mean particle size 5 μm) were then stirred into each of these dilute dispersions. After the addition of the filler, the formulations were stirred for a further 5 minutes under reduced pressure (800 mbar) in order to remove air bubbles contained therein.

The elastic recovery of the resulting sealing compounds was determined according to DIN 52,458 after storage of the test specimens for 4 weeks at 23° C and 50% relative humidity at an extension of 100%. The results are shown in Table 3.

TABLE 3

| | Elastic recovery % |
|---|---|
| Sealing compound M 2 | 60 |
| Sealing compound M 3 | 65 |
| Sealing compound M 4 | 70 |
| Sealing compound M 5 | 60 |

We claim:
1. An aqueous formulation suitable as a sealing compound or an adhesive for ceramic tiles and containing as essential components,
   A) from 3 to 30% by weight of plastics particles which consist of
      a) from 0.1 to 4% by weight of one or more mercaptosilanes of the general formula I

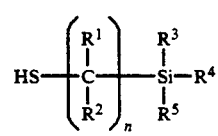

where n is from 1 to 8, $R^1$ and $R^2$ are individually hydrogen or $C_1$-$C_4$-alkyl, $R^3$, $R^4$ and $R^5$ are individually $C_1$-$C_6$-alkyl or $C_1$-$C_6$-alkoxy, with the proviso that one or more of the radicals $R^3$ to $R^5$ is alkoxy, and b) ethylenically unsaturated monomers capable of undergoing free radical polymerization, as the residual amount, the polymer having a glass transition temperature of from $-60°$ to $+40°$ C., B) from 40 to 90% by weight of an inorganic filler, C) an effective amount of an emulsifier, D) from 0 to 15% by weight of an external plasticizer and E) from 5 to 40% by weight of water.

2. An aqueous formulation as claimed in claim 1, containing, as essential components, from 3 to 25% by weight of component A,
from 50 to 85% by weight of component B,
from 0 to 15% by weight of component D,
from 10 to 30% by weight of component E and
an effective amount of an emulsifier C.

3. An aqueous formulation as claimed in claim 1, containing, as essential components, from 15 to 30% by weight of component A,
from 40 to 60% by weight of component B,
from 0 to 15% by weight of component D,
from 15 to 25% by weight of component E and
an effective amount of an emulsifier C.

4. An aqueous formulation as claimed in claim 2, containing, as component A, a polymer having a glass transition temperature of from $0°$ to $30°$ C.

5. An aqueous formulation as claimed in claim 3, containing, as component A, a polymer having a glass transition temperature of from $-55$ to $-5°$ C.

6. An aqueous formulation as claimed in claim 3, containing from 0.1 to 1% by weight of a thickener as an additional assistant.

7. An aqueous formulation as claimed in claim 5, containing from 0.1 to 1% by weight of a thickener as an additional assistant.

8. An aqueous formulation as claimed in claim 1, containing, as component B, calcium carbonate having a mean particle size of from 0.5 to 200 $\mu$m.

* * * * *